(12) United States Patent
Takahashi (10) Patent No.: US 9,122,123 B2
(45) Date of Patent: Sep. 1, 2015

(54) PROJECTOR HAVING FOCUS ADJUSTING SECTION FOR ADJUSTING PROJECTION BASED ON PROJECTION DISTANCE INFORMATION, COMPUTER PROGRAM PRODUCT, AND IMAGE PROJECTING METHOD

(75) Inventor: Tadao Takahashi, Oita (JP)

(73) Assignee: Seiko Epson Corporation, Tokyo (JP)

( * ) Notice: Subject to any disclaimer, the term of this patent is extended or adjusted under 35 U.S.C. 154(b) by 636 days.

(21) Appl. No.: 12/813,647

(22) Filed: Jun. 11, 2010

(65) Prior Publication Data

US 2010/0315602 A1 Dec. 16, 2010

(30) Foreign Application Priority Data

Jun. 11, 2009 (JP) ................................. 2009-140117
Jun. 4, 2010 (JP) ................................. 2010-128493

(51) Int. Cl.
*G03B 21/14* (2006.01)
*G03B 3/00* (2006.01)
*H04N 9/31* (2006.01)

(52) U.S. Cl.
CPC ................ *G03B 3/00* (2013.01); *H04N 9/3185* (2013.01)

(58) Field of Classification Search
CPC .................................................... H04N 9/3185
USPC ........................ 353/69, 70, 100, 101; 348/745
See application file for complete search history.

(56) References Cited

U.S. PATENT DOCUMENTS

| 2005/0012908 A1 | 1/2005 | Hirao et al. |
| 2005/0099607 A1* | 5/2005 | Yokote et al. ................... 353/43 |
| 2005/0168705 A1* | 8/2005 | Li et al. ............................ 353/69 |
| 2006/0087626 A1* | 4/2006 | Dickie et al. ................... 353/100 |
| 2007/0046902 A1* | 3/2007 | Yajima ............................. 353/70 |
| 2007/0242233 A1* | 10/2007 | Sokeila et al. ................... 353/69 |
| 2008/0291340 A1 | 11/2008 | Hirai |
| 2009/0115915 A1* | 5/2009 | Steinberg et al. ............... 353/69 |
| 2010/0128231 A1* | 5/2010 | Furui ............................... 353/70 |

FOREIGN PATENT DOCUMENTS

| JP | 2003-348498 A | 12/2003 |
| JP | 2005-037773 A | 2/2005 |
| JP | 2005-079939 A | 3/2005 |
| JP | 2005-094599 A | 4/2005 |
| JP | 2006-030533 A | 2/2006 |
| JP | 2006-133679 A | 5/2006 |
| JP | 2008-289078 A | 11/2008 |
| JP | 2009-118300 A | 5/2009 |

* cited by examiner

*Primary Examiner* — Sultan Chowdhury
*Assistant Examiner* — Danell L Owens
(74) *Attorney, Agent, or Firm* — ALG Intellectual Property, LLC (57) ABSTRACT

A projector includes: a judging section that judges whether or not an event representing an instruction to project a message image containing a character string has occurred; a projection distance information generating section that generates projection distance information representing a projection distance when the event has occurred; a focus adjusting section that carries out focus adjustment for projection based on the projection distance information; and a projecting section that projects the message image after the focus adjustment is started.

10 Claims, 7 Drawing Sheets

- INSTALL PROJECTOR SO THAT MESSAGE BOX IS LOCATED AT THE CENTER OF PROJECTED PLANE

- CARRY OUT ZOOM ADJUSTMENT SO THAT OUTER LINE OF MESSAGE BOX BECOMES LARGER THAN SCREEN IN CASE OF PROJECTING ON THE SCREEN

WHEN READY, PRESS BUTTON LABELED WITH "EASY SETUP"

[EASY SETUP]: EXECUTE          [RETURN]: STOP

PROJECTOR HAVING FOCUS ADJUSTING SECTION FOR ADJUSTING PROJECTION BASED ON PROJECTION DISTANCE INFORMATION, COMPUTER PROGRAM PRODUCT, AND IMAGE PROJECTING METHOD

CROSS-REFERENCE

The present application claims priority from Japanese Patent Application No. 2009-140117 filed on Jun. 11, 2009, and Japanese Patent Application No. 2010-128493 filed on Jun. 4, 2010 which is hereby incorporated by reference in its entirety.

BACKGROUND

A guide image including a character string or any other similar image is projected in some cases as described, for example, in Japanese Patent Publication No. 2009-118300. In this case, it is assumed that focus adjustment has been carried out and a user can read the character string.

When a projector, a screen, or any other objects is moved after the focus adjustment, however, the focus adjustment is no longer effective and the user may not be able to read the character string. Further, for example, in a projector configured in such away that trapezoidal distortion correction is automatically performed after the projector is moved, the projector projects an image containing a character string that prompts the user to check whether the trapezoidal distortion correction can be performed so that a wrong operation will not trigger any trapezoidal distortion correction. In this case as well, the focus adjustment is not carried out and the user may not be able to read the character string.

SUMMARY

Various embodiments may provide a projector, a computer program product, and an image projecting method that allow an image containing a character string to be readily read even when no focus adjustment has been carried out.

A projector according to at least one embodiment of the disclosure includes a judging section that judges whether or not an event representing an instruction to project a message image containing a character string has occurred, a projection distance information generating section that generates projection distance information representing a projection distance when the event has occurred, a focus adjusting section that carries out focus adjustment for projection based on the projection distance information, and a projecting section that projects the message image in a condition where the focus adjustment is carried out.

A projector according to at least one embodiment of the disclosure includes a judging section that judges whether or not an event representing an instruction to project a message image containing a character string has occurred, a projection distance information generating section that generates projection distance information representing a projection distance when the event has occurred, a focus adjusting section that carries out focus adjustment for projection based on the projection distance information, and a projecting section that projects the message image after the focus adjustment is started.

A computer program product according to at least one embodiment of the disclosure comprises instructions executable by a computer in a projector including a projecting section to perform: judging whether or not an event representing an instruction to project a message image containing a character string has occurred, generating projection distance information representing a projection distance when the event has occurred, carrying out focus adjustment for projection based on the projection distance information, and causing the projecting section to project the message image in a condition where the focus adjustment is completed.

A computer program product according to at least one embodiment of the disclosure comprises instructions executable by a computer in a projector including a projecting section to perform: judging whether or not an event representing an instruction to project a message image containing a character string has occurred, generating projection distance information representing a projection distance when the event has occurred, starting focus adjustment for projection based on the projection distance information, and causing the projecting section to project the message image after the focus adjustment is started.

An image projecting method according to at lease one embodiment of the disclosure is used in a projector, the method including judging whether or not an event representing an instruction to project a message image containing a character string has occurred, generating projection distance information representing a projection distance when the event has occurred, carrying out focus adjustment for projection purposes based on the projection distance information, and projecting the message image in a condition where the focus adjustment is completed.

An image projecting method according to at lease one embodiment of the disclosure is used in a projector, the method including judging whether or not an event representing an instruction to project a message image containing a character string has occurred, generating projection distance information representing a projection distance when the event has occurred, starting focus adjustment for projection purposes based on the projection distance information, and projecting the message image after the focus adjustment is started.

According to the embodiments, since the projector can project the message image after the focus adjustment is started in any situation, the user can readily view an image containing a character string.

The projector described above may further include an instructing section through which instruction information representing the instruction to project the message image is inputted, and the judging section may judge whether or not the event has occurred in case that the instruction information has been inputted.

In the thus configured projector, even when no focus adjustment has been carried out, the user can readily view an image containing a character string because the message image in the situation that the focus is automatically adjusted is projected by instructing to project the message image.

The projector described above may further include a vibration detecting section that detects the vibration of the projector, and the judging section may judge whether or not the event has occurred in case that the vibration detected by the vibration detecting section.

In the thus configured projector, even when the projector is installed in a variety of locations, for example, like a portable projector, the projector can project the message image in the situation that the focus is automatically adjusted immediately after the installation, whereby the projector can inform the user of the contents of an instruction in a more reliably manner.

The message image may be an instruction image that prompts a user to adjust the position where the projector is installed before trapezoidal distortion correction is performed, and the projecting section may project a trapezoidal distortion correction image used to perform trapezoidal distortion correction after the installation position is adjusted.

In the thus configured projector, the projector can inform the user of the contents of an instruction in a more reliably manner when the projector issues an instruction to correct trapezoidal distortion to the user.

The projector described above may further include an imaging section. The projecting section may project a focus adjustment image when the event has occurred. The imaging section may capture the focus adjustment image to produce a captured image. The projection distance information generating section may generate the projection distance information based on the captured image.

In the thus configured projector, since the projector can use the imaging section, which is used to perform the trapezoidal distortion correction and other operations, to produce the projection distance information and perform the focus adjustment, no distance sensor or any other suitable component dedicated to the focus adjustment is required, whereby the focus adjustment and other operations can be carried out at a lower cost.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENTS

Embodiments in which the invention is applied to a projector will be described below with reference to the drawings. It is noted that the embodiments described below do not limit in any sense the contents of the invention set forth in the claims. It is further noted that all the configurations shown in the following embodiments are not necessarily essential for solutions in the invention set forth in the claims.

First Embodiment

A projector according to the present embodiment projects an instruction image that prompts a user to adjust the position where the projector is installed before trapezoidal distortion correction is performed in response to an instruction from the user. The projector according to the present embodiment, which is instructed to project the instruction image, does so in a condition where focus adjustment is carried out.

Figure 1:
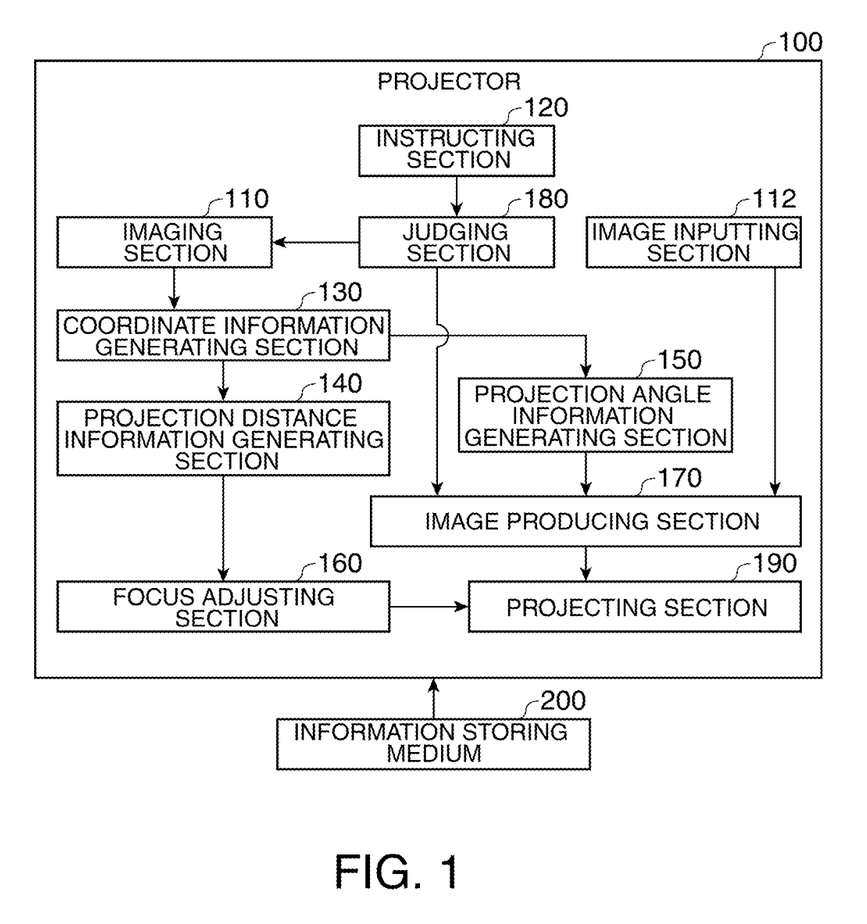
FIG. 1 is a functional block diagram of a projector in a first embodiment.

A description will be made of function blocks of a projector having the function described above. FIG. 1 is a functional block diagram of a projector 100 in the first embodiment. The projector 100 includes an imaging section 110 that captures a screen or any other similar object to produce a captured image, an image inputting section 112 to which image information (RGB signals, for example) is inputted from a PC (Personal Computer) or any other apparatus, an instructing section 120 that inputs instruction information, for example, when a button is pressed, a coordinate information generating section 130 that generates information on the coordinates of a reference point contained in the captured image and used, for example, as a reference for a projection distance, a projection distance information generating section 140 that generates projection distance information based on the coordinate information, a projection angle information generating section 150 that generates projection angle information based on the coordinate information, a focus adjusting section 160 that carries out focus adjustment for projection purposes based on the projection distance information, an image producing section 170 that produces an image based on, for example, the image information, a judging section 180 that makes a variety of judgment, and a projecting section 190 that projects the image.

To achieve the functions described above, the projector 100 may use the following hardware: For example, the projector 100 may use a CCD camera or any other suitable device as the imaging section 110; an image signal input port, a converter, and other components as the image inputting section 112; a button, a remote controller, a light receiver, and other components as the instructing section 120; a CPU and other components as the coordinate information generating section 130, the projection distance information generating section 140, the projection angle information generating section 150, the focus adjusting section 160, and the judging section 180; an image processing circuit and other components as the image producing section 170; and a lamp, a liquid crystal panel, a liquid crystal drive circuit, a zoom lens, a zoom lens drive circuit, a zoom lens drive motor, a projection lens, and other components as the projecting section 190.

A computer accommodated in the projector 100 may read a program stored in an information storing medium 200 and function as the judging section 180 and other sections. Examples of the information storing medium 200 may include a CD-ROM, a DVD-ROM, a ROM, a RAM, and an HDD.

Figure 2:
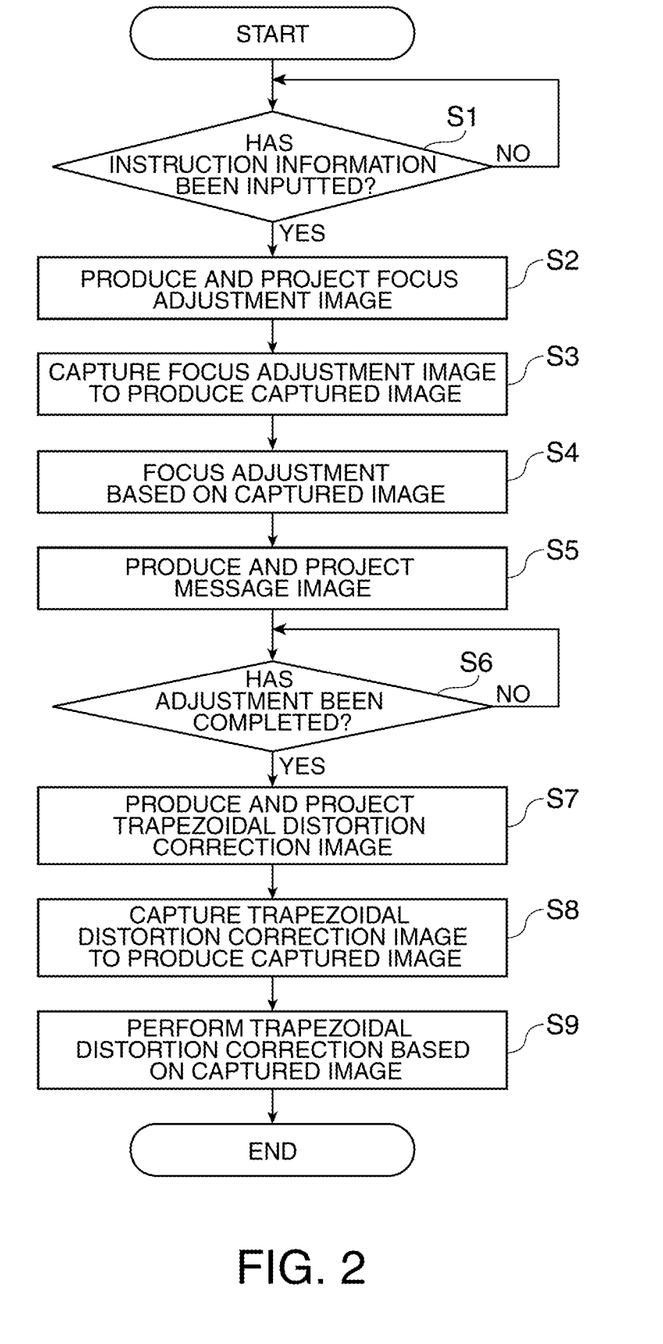
FIG. 2 is a flowchart showing an image projecting procedure in the first embodiment.

A description will next be made of an image projecting procedure using the sections described above. FIG. 2 is a flowchart showing the image projecting procedure in the first embodiment. The user installs the projector 100 in a desired location and presses, for example, an automatic trapezoidal distortion correction button provided on the body of the projector 100.

The judging section 180 judges whether or not an event representing a message image projecting instruction occurs. More specifically, the judging section 180 judges based on information from the instructing section 120 whether instruction information representing an automatic trapezoidal distortion correction instruction has been inputted (step S1).

When the instruction information has been inputted, the image producing section 170 produces a focus adjustment image in response to an instruction from the judging section 180, and the projecting section 190 projects the focus adjustment image on a screen (step S2). The image producing section 170 may produce the image (such as the focus adjustment image) in accordance with the program, may produce the image by using image data stored in the ROM or any other device, or may produce the image by using the image information inputted from the PC or any other apparatus.

Figure 3:
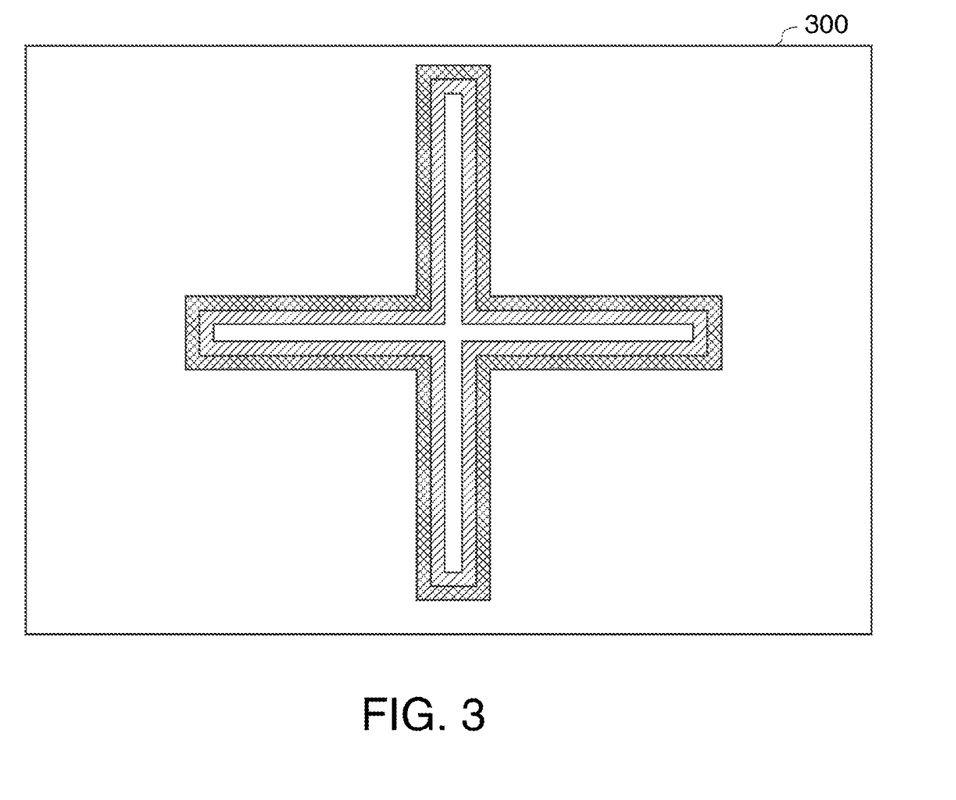
FIG. 3 shows an exemplary focus adjustment image in the first embodiment.

FIG. 3 shows an exemplary focus adjustment image 300 in the first embodiment. The focus adjustment image 300 includes a patterned image having a "+" shape formed of two straight lines intersecting each other at right angles. Each of the straight lines contained in the patterned image has gradation so that a central portion of the line is the brightest portion and a peripheral portion of the line is the darkest portion. For example, the focus adjustment image 300 shown in FIG. 3 has a white area in the central portion of each of the lines, light gray areas that sandwich the white area, and dark gray areas that sandwich the light gray areas. The background around the patterned image is an area having a grayscale (white or black area, for example) different from that of the peripheral area (the dark gray area in the present embodiment) of the patterned image.

The imaging section 110 captures the focus adjustment image 300 projected on the screen to produce a captured image (step S3). The focus adjusting section 160 carries out focus adjustment based on the captured image (step S4).

More specifically, the coordinate information generating section 130 first uses information on brightness or any other suitable parameter of the captured image to perform parabolic approximation, gravity center computation, or any other suitable computation so as to determine the coordinates of the white area, which includes the intersection (central position) of the straight lines of the "+"-shaped patterned image contained in the captured image, as the coordinates of the reference point.

The determined coordinates are two-dimensional coordinates in an area where the imaging section 110 forms an image. To carry out only the focus adjustment, at least one reference point suffices.

The coordinate information generating section 130 processes the two-dimensional coordinates by performing active stereoscopy-based computation, which uses the parallax between the projection lens of the projecting section 190 and an imaging lens of the imaging section 110, to determine the coordinates of the reference point on the screen. The thus produced coordinates are three-dimensional coordinates in a projection coordinate system, the origin of which is the principal point of the projection lens.

Since the principal point of the projection lens is the origin, the projection distance information generating section 140 generates projection distance information representing the distance (projection distance) from the principal point of the projection lens to the reference point on the screen by using the three-dimensional coordinates described above.

Based on the projection distance information, the focus adjusting section 160 carries out the focus adjustment by using the zoom lens drive circuit in the projecting section 190 to drive the zoom lens motor in accordance with the projection distance.

The image producing section 170 produces a message image in a condition where the focus adjustment is completed, and the projecting section 190 projects the message image on the screen (step S5).

Figure 4:
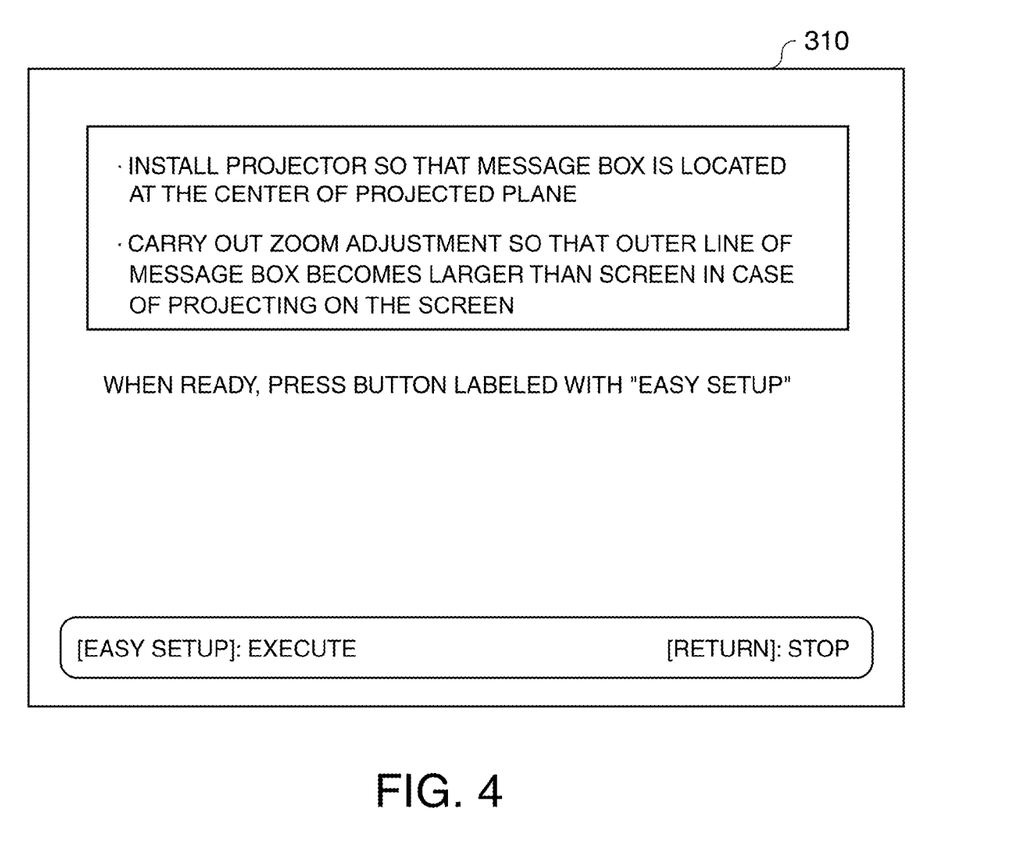
FIG. 4 shows an exemplary message image in the first embodiment.

FIG. 4 shows an exemplary message image 310 in the first embodiment. The message image 310 is an instruction image that prompts the user to adjust the position where the projector is installed before trapezoidal distortion correction is performed. Specifically, the message image 310 contains a character string that prompts the user to adjust the position where the projector 100 is installed or a character string that prompts the user to press a predetermined button in a condition where the adjustment is completed. An example of the character string that prompts the install position adjustment is "Install the projector so that the message box is located at the center of the projected plane. Carry out zoom adjustment so that outer line of message box becomes larger than screen in case of projecting on the screen"

The user installs the projector 100 in accordance with the message image 310 and presses a predetermined button provided on the projector 100 as instructed by the message image 310. The judging section 180 judges whether the adjustment has been completed by judging whether the predetermined button has been pressed based on information from the instructing section 120 (step S6).

When the adjustment has been completed, the image producing section 170 produces a trapezoidal distortion correction image in response to an instruction from the judging section 180, and the projecting section 190 projects the trapezoidal distortion correction image (step S7).

Figure 5:
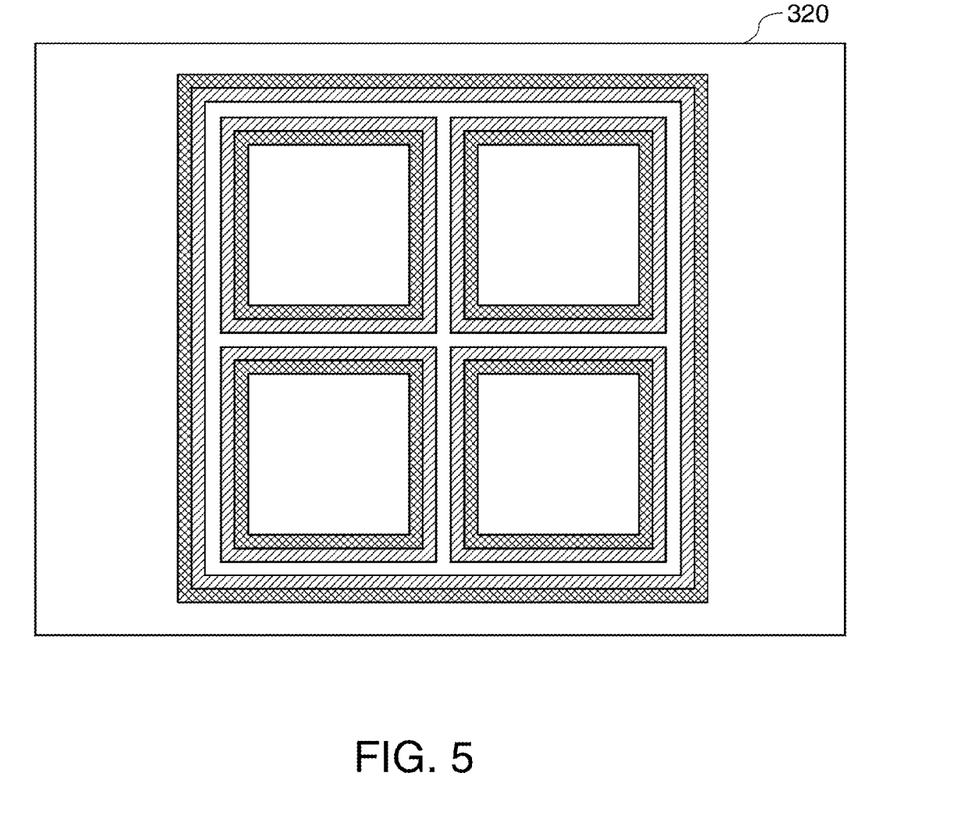
FIG. 5 shows an exemplary trapezoidal distortion correction image in the first embodiment.

FIG. 5 shows an exemplary trapezoidal distortion correction image 320 in the first embodiment. The trapezoidal distortion correction image 320 includes a patterned image having gradation similar to that in the focus adjustment image 300 but having a different shape. The patterned image in the trapezoidal distortion correction image 320 is formed of four rectangles arranged in two rows by two columns connected to one another. That is, the patterned image is formed by drawing three straight lines parallel to the vertical direction and evenly spaced apart and three straight lines parallel to the horizontal direction and evenly spaced apart in such away that they intersect at right angles and 9 intersections in total are generated.

The imaging section 110 captures the trapezoidal distortion correction image projected on the screen to produce a captured image (step S8). The image producing section 170 and other sections perform trapezoidal distortion correction based on the captured image (step S9).

More specifically, the coordinate information generating section 130 first uses information on brightness or any other suitable parameter of the captured image to perform parabolic approximation, gravity center computation, or any other suitable computation so as to determine the coordinates of the white area, which includes the 9 intersections contained in the captured image, as the coordinates of reference points. The determined coordinates are two-dimensional coordinates in an area where the imaging section 110 forms an image.

The coordinate information generating section 130 processes the two-dimensional coordinates by performing active stereoscopy-based computation, which uses the parallax between the projection lens of the projecting section 190 and the imaging lens of the imaging section 110, to determine the coordinates of the reference points on the screen. The thus produced coordinates are three-dimensional coordinates in the projection coordinate system, the origin of which is the principal point of the projection lens.

The projection angle information generating section 150 uses at least three sets of three-dimensional coordinates among the three-dimensional coordinates of the 9 reference points described above to generate projection angle information representing the vertical and horizontal inclination (projection angle) of the projection light relative to the screen.

The image producing section 170 figures out the distortion level of the image based on the projection angle information and sets a correction target area, which is a distortion corrected, desired image formation area of the liquid crystal panel, in accordance with the distortion level. The image producing section 170 produces an image in the correction target area of the liquid crystal panel based on image information from the image inputting section 112, and the projecting section 190 projects the image. In this way, the projector 100 can project a rectangular image having undergone the trapezoidal distortion correction on the screen.

As described above, according to the present embodiment, since the projector 100 having received a trapezoidal distortion correction instruction can project the message image 310 in a condition where focus adjustment is completed, the user can readily view the character string-containing image. In this way, the user can install the projector 100 appropriately in accordance with the instruction, and the projector 100 can perform trapezoidal distortion correction more accurately.

Further, according to the present embodiment, since the projector 100 can use the imaging section 110, which is used to perform the trapezoidal distortion correction and other operations, to produce the projection distance information and perform the focus adjustment, no distance sensor or any other suitable component dedicated to the focus adjustment is required, whereby the focus adjustment and other operations can be carried out at a lower cost.

As described above, since the focus adjustment is automatically carried out before the trapezoidal distortion correction is performed, the user can use the projector 100 in good conditions even when the user moves the projector 100 to a variety of locations before use.

Second Embodiment

In the first embodiment, the projector 100 having received a trapezoidal distortion correction instruction projects the message image 310 in a condition where the focus adjustment is carried out. The focus adjustment may also be carried out, for example, when the message image 310 is projected depending on the transported state of the projector 100. That is, an event judged by the judging section 180 is not limited to an event in which instruction information is inputted but may, for example, be an event in which the vibration of the projector 100 satisfies a certain condition (for example, when the projector 100 is moved by at least a predetermined distance).

Figure 6:
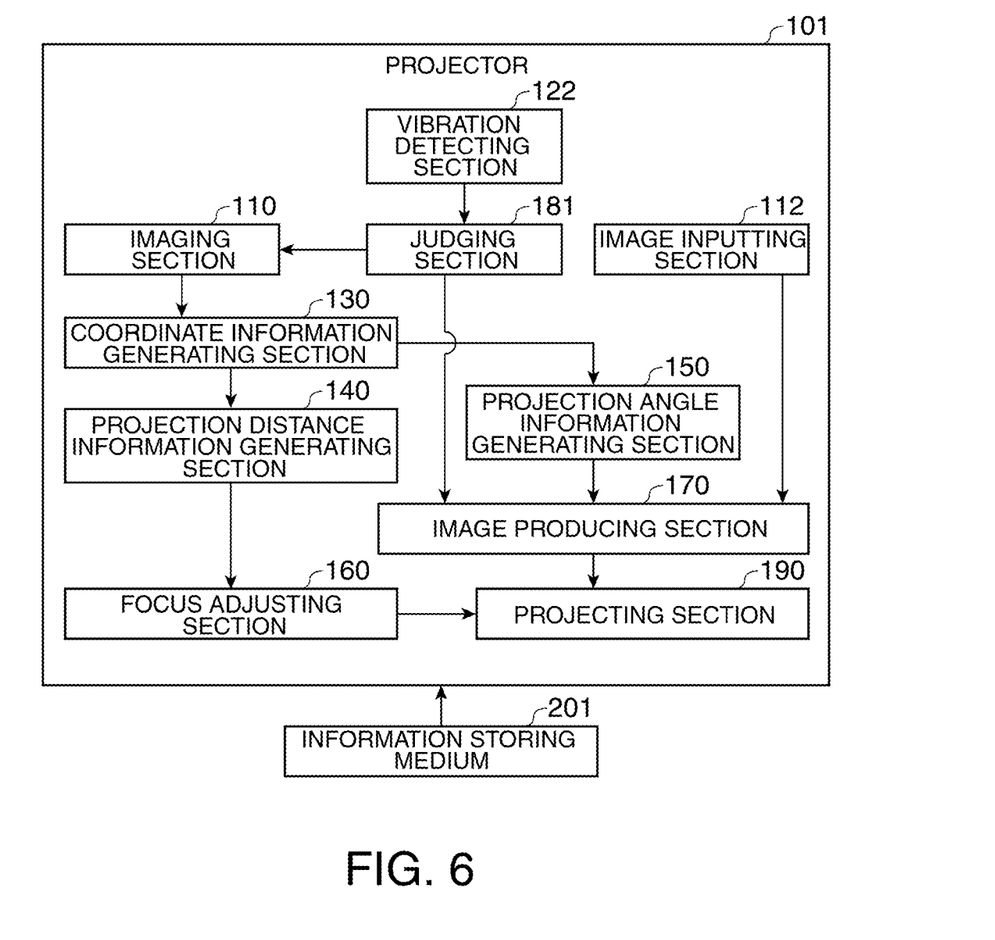
FIG. 6 is a functional block diagram of a projector in a second embodiment.

FIG. 6 is a functional block diagram of a projector 101 in a second embodiment. The configuration of the projector 101 is similar to that of the projector 100 in the first embodiment but different therefrom in that the instructing section 120 is replaced with a vibration detecting section 122 and a judging section 181 makes judgment according to the vibration detected by the vibration detecting section 122. The projector 101 may also read a program from an information storing medium 201 and function as the judging section 181 and other sections.

Figure 7:
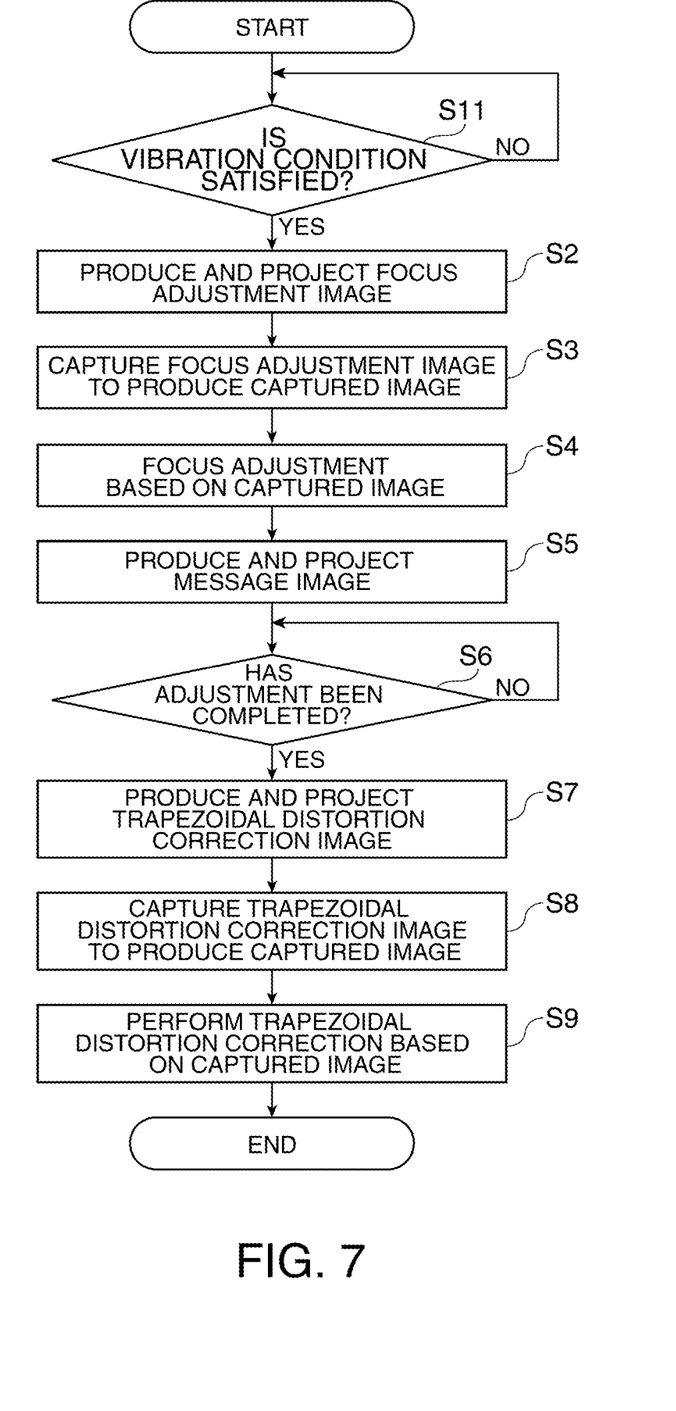
FIG. 7 is a flowchart showing an image projecting procedure in the second embodiment.

An image projecting procedure in the second embodiment will next be described. FIG. 7 is a flowchart showing the image projecting procedure in the second embodiment. The vibration detecting section 122 always or at fixed time intervals detects the vibration of the projector 101. Examples of the vibration detecting section 122 may include a two-dimensional sensor, a three-dimensional sensor, a gyroscopic sensor, and any other variety of sensors capable of detecting vibration.

The judging section 181 judges whether the vibration of the projector 100 satisfies a certain condition in accordance with the detected value from the vibration detecting section 122 (step S11). The vibration condition corresponds to, for example, a condition in which the travel per unit time (1 second, for example) is at least a predetermined value (10 cm, for example).

When the vibration condition is satisfied, the projector 101 carries out the focus adjustment described above, then projects the message image 310, and performs trapezoidal distortion correction. The processes after the step S11 are the same as those in the first embodiment, and no description thereof will be made.

As described above, according to the present embodiment, even when the projector 101 is installed in a variety of locations, for example, like a portable projector, the projector 101 can project the message image 310 in a condition where the focus adjustment is carried out immediately after the installation, whereby the projector 101 can inform the user of the contents of an instruction in a more reliably manner. Further, the user can view an image having undergone automatic focus adjustment and trapezoidal distortion correction without any button operation or other operations.

Other Embodiments

The invention is not necessarily applied to the embodiments described above, but a variety of variations can be implemented. For example, in the above embodiments, the projecting section 190 projects the message image 310 after the focus adjustment is carried out, but may project the message image 310 before the focus adjustment is completed and after the focus adjustment is started. Therefore the projector 100, 101 can project the image including a character string so that the user can see more readily compared with the case where the focus adjustment is not carried out at all. Moreover, projector 100, 101 can prevent the state that nothing is displayed until the focus adjustment is completed, and can eliminate user's uneasiness and waiting time to the adjustment of the zoom lens of the projecting section 190 in a time-consuming case.

The focus adjustment image 300 and the trapezoidal distortion correction image 320 are not limited to the shapes described above. For example, the patterned image in the trapezoidal distortion correction image 320 may have straight lines that lie off the contour of the patterned image shown in FIG. 5 (for example, a "#"-like shape when the patterned image is rectangular).

The number of grayscales of the patterned image described above is three, but the number may be four or greater. Further, areas having the same grayscale are disposed on both sides of the white area in the patterned image described above, but areas having different grayscales may alternatively be disposed only on one side. For example, the patterned image may be a linear image formed of a leftmost dark gray area, a central light gray area, and a rightmost white area.

The trapezoidal distortion correction image may include a plurality of patterned images in the single image. For example, the trapezoidal distortion correction image may include a patterned image having a "+" shape for each reference point. Further, the number of reference points used to perform the trapezoidal distortion correction and other operations may be 8 or smaller or 10 or greater.

The patterned image does not necessarily have a linear shape but may have a curved shape or a dot-like shape. The lines that form the patterned image do not necessarily intersect each other at right angles but may be inclined in oblique directions. That is, the patterned image does not necessarily have a "+"-like shape but may have a "x"-like shape. Each of the projectors 100 and 101 may perform the focus adjustment and the trapezoidal distortion correction substantially at the same time by using only the trapezoidal distortion correction image 320.

The message image 310 is not limited to an instruction image displayed before trapezoidal distortion correction but may, for example, be a notification image including a character string that represents the state of or any other information on the projector 100 or 101 or an image including a character string that prompts the user to check whether or not the trapezoidal distortion correction or any other operation can be performed (for example, "May the projector perform trapezoidal distortion correction?").

The focus adjustment method is not limited to that used in the embodiments described above. For example, each of the projectors 100 and 101 may produce a plurality of captured images taken from different directions by using a plurality of imaging sections, and compute three-dimensional coordinates of a reference point in the patterned image on the screen by performing passive stereoscopy-based computation. For another example, each projector 100 and 101 may produce a plurality of captured images taken by adjusting the focus adjusting section and adjust the focus adjusting section by searching the highest contrast image from the captured images.

The trapezoidal distortion correcting method is also not limited to those used in the embodiments described above. For example, each of the projectors 100 and 101 may figure out the distortion level of an image by imaging the screen with no image projected thereon, setting vanishing points based on the position and inclination of each side of the screen in the captured image, and performing projective transformation in which the two-dimensional coordinates of the vanishing points in a camera coordinate system are converted into three-dimensional coordinates in a projection coordinate system.

The projection distance information generating section 140 may alternatively generate the projection distance information in accordance with a measured value from a distance sensor, user's selection of the projection distance when an image that prompts the user to select the projection distance is projected, user's input of a value representing the projection distance, or any other suitable parameter. Further, the projection distance is not limited to the distance from the principal point of the projection lens to the reference point described above, but may be a value representing the distance from the projector 100 or 101 to the screen, a wall, a blackboard, or any other suitable object on which an image is projected.

The coordinate information produced by the coordinate information generating section 130 is not limited to the information representing three-dimensional coordinates in the projection coordinate system, but may, for example, be information representing three-dimensional coordinates in an imaging coordinate system. That is, when the projection lens and the imaging lens are located substantially in the same position in the projector 100 or 101, two-dimensional coordinates in the imaging coordinate system may be directly converted into three-dimensional coordinates in the imaging coordinate system.

Each of the projectors 100 and 101 is not limited to a (transmissive or reflective, such as LCOS) liquid crystal projector, but may, for example, be a projector using a DMD (Digital Micromirror Device). The functions of the projector 100 or 101 may be distributed to a plurality of apparatus (for example, a PC and a projector, an external camera and a projector, and other combinations).

What is claimed is:

1. A projector comprising:
    a judging section that judges whether or not a first event representing an instruction to project a message image containing a character string and an outer line has occurred;
    a focus adjustment section that starts focus adjustment for projection if the judging section judges that the first event has occurred; and
    a projecting section that:
        projects the message image, which prompts a user to adjust the position of the outer line projected in a screen to be larger than the screen before trapezoidal distortion correction is performed, after the focus adjustment is started, and
        projects a trapezoidal distortion correction image, which is used to perform trapezoidal distortion correction automatically, in response to the projection of the message image and in response to receiving input indicating that the position of the outer line projected in the screen has been adjusted to be larger than the screen.

2. The projector according to claim 1,
    further comprising an instructing section through which instruction information representing the instruction to project the message image is inputted,
    wherein the judging section judges whether or not the first event occurs in case that the instruction information has been inputted.

3. The projector according to claim 1,
    further comprising a vibration detecting section that detects the vibration of the projector,
    wherein the judging section judges whether or not the first event has occurred in case that the vibration detected by the vibration detecting section.

4. The projector according to claim 1,
    further comprising an imaging section,
    wherein the projecting section projects a focus adjustment image when the first event has occurred,
    the imaging section captures the focus adjustment image to produce a captured image, and
    the projection distance information generating section generates the projection distance information based on the captured image.

5. A computer program product embodied in a non-transitory computer readable medium and comprising instructions executable by a computer in a projector including a projecting section, the instructions executable to perform the functions of:
    judging whether or not a first event representing an instruction to project a message image containing a character string and an outer line has occurred;
    starting focus adjustment for projection if the first event is judged to have occurred; and
    causing the projecting section to
        project the message image, which prompts a user to adjust the position of the outer line projected in a screen to be larger than the screen before trapezoidal distortion correction is performed, after the focus adjustment is started, and
        project a trapezoidal distortion correction image, which is used to perform trapezoidal distortion correction automatically, in response to the projection of the message image and in response to receiving input indicating that the position of the outer line projected in the screen has been adjusted to be larger than the screen.

6. An image projecting method used in a projector, the method comprising the steps of:
    judging whether or not a first event representing an instruction to project a message image containing a character string and an outer line has occurred;
    starting focus adjustment for projection if the first event is judged to have occurred;
    projecting the message image, which prompts a user to adjust the position of the outer line projected in a screen to be larger than the screen before trapezoidal distortion correction is performed, after the focus adjustment is started; and projecting a trapezoidal distortion correction image, which is used to perform trapezoidal distortion correction automatically, in response to the projection of the message image and in response to receiving input indicating that the position of the outer line projected in the screen has been adjusted to be larger than the screen.

7. The projector according to claim 1, wherein the first event represents an instruction of the operation of the projector and the message image is an instruction image indicating an adjustment of the projector that is necessary before the projector operates in accordance with the first event.

8. The projector according to claim 1, wherein the first event represents an instruction of the operation of the projector and the message image is a notification image indicating a notification that is necessary before the projector operates in accordance with the first event.

9. The projector according to claim 1,
wherein the projecting section starts the trapezoidal distortion correction if the judging section judges that a second event has occurred.

10. The projector according to claim 1,
wherein the projecting section projects the message image, which prompts a user to adjust the position of a message box to be moved into the middle of the projected plane.

* * * * *